US012663510B2

(12) United States Patent
Marotti

(10) Patent No.: US 12,663,510 B2
(45) Date of Patent: Jun. 23, 2026

(54) VEHICULAR RADAR SYSTEM WITH BLOCKAGE DETECTION

(71) Applicant: Magna Electronics Inc., Auburn Hills, MI (US)

(72) Inventor: Luca Marotti, Munich (DE)

(73) Assignee: Magna Electronics Inc., Auburn Hills, MI (US)

( * ) Notice: Subject to any disclaimer, the term of this patent is extended or adjusted under 35 U.S.C. 154(b) by 209 days.

(21) Appl. No.: 18/783,862

(22) Filed: Jul. 25, 2024

(65) Prior Publication Data

US 2025/0035745 A1 Jan. 30, 2025

Related U.S. Application Data

(60) Provisional application No. 63/516,238, filed on Jul. 28, 2023.

(51) Int. Cl.
G01S 7/40 (2006.01)
G01S 13/93 (2020.01)
G01S 13/931 (2020.01)

(52) U.S. Cl.
CPC .......... G01S 7/4039 (2021.05); G01S 13/931 (2013.01)

(58) Field of Classification Search
CPC ................. G01S 7/4039; G01S 13/931; G01S 2013/93271; G01S 13/42; G01S 2013/93275
See application file for complete search history.

(56) References Cited

U.S. PATENT DOCUMENTS

| | | | |
|---|---|---|---|
| 7,375,803 B1 | 5/2008 | Bamji | |
| 7,405,812 B1 | 7/2008 | Bamji | |
| 7,954,866 B2 | 6/2011 | Barcomb et al. | |
| 7,970,150 B2 * | 6/2011 | Oxford | H04R 3/005 381/94.1 |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,653,796 B2 | 5/2017 | Pleva | |
| 9,689,967 B1 | 6/2017 | Stark et al. | |
| 9,753,121 B1 | 9/2017 | Davis et al. | |

(Continued)

*Primary Examiner* — William Kelleher
*Assistant Examiner* — Juliana Cross
(74) *Attorney, Agent, or Firm* — HONIGMAN LLP

(57) ABSTRACT

A vehicular radar sensing system includes a radar sensor disposed at a vehicle. The radar sensor transmits and receives radio signals. The vehicular radar sensing system, via processing of radar data captured by the radar sensor, detects a plurality of objects present within a field of sensing of the radar sensor. The system determines a plurality of phase delays in the radar data. Phase delays of the plurality of phase delays are associated with respective received radio signals reflected off respective detected objects of the plurality of detected objects. The vehicular radar sensing system determines a common phase delay of the plurality of phase delays that is common among the received radio signals reflected off detected objects. The system, responsive to determining that an amount of performance degradation of the radar sensor based on the blockage is greater than a threshold amount, adjusts a driving assistance system of the vehicle.

28 Claims, 4 Drawing Sheets

(56)　　　　References Cited

U.S. PATENT DOCUMENTS

| | | | |
|---|---|---|---|
| 9,828,036 B2 | 11/2017 | Frayer et al. | |
| 9,869,762 B1 | 1/2018 | Alland et al. | |
| 9,954,955 B2 | 4/2018 | Davis et al. | |
| 9,963,085 B2 | 5/2018 | Smith et al. | |
| 10,069,535 B2 * | 9/2018 | Vannucci | H01P 3/10 |
| 10,239,446 B2 | 3/2019 | May et al. | |
| 10,534,081 B2 | 1/2020 | Wodrich | |
| 10,768,298 B2 | 9/2020 | Wodrich et al. | |
| 10,866,306 B2 | 12/2020 | Maher et al. | |
| 12,044,794 B2 | 7/2024 | Wodrich et al. | |
| 12,345,809 B2 | 7/2025 | Bui-Van et al. | |
| 2010/0245066 A1 | 9/2010 | Sarioglu et al. | |
| 2012/0021691 A1 * | 1/2012 | Boe | H03F 1/3247 |
| | | | 455/67.11 |
| 2014/0111370 A1 | 4/2014 | Aleem et al. | |
| 2016/0023598 A1 | 1/2016 | Kohler et al. | |
| 2017/0047649 A1 | 2/2017 | Himmelstoss | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0053994 A1 * | 2/2018 | Grando | H01Q 1/281 |
| 2018/0231635 A1 | 8/2018 | Woehlte | |
| 2019/0339382 A1 | 11/2019 | Hess et al. | |
| 2020/0249343 A1 | 8/2020 | Yu et al. | |
| 2021/0373152 A1 | 12/2021 | Roh et al. | |
| 2022/0201886 A1 | 6/2022 | Fuke | |
| 2023/0415734 A1 | 12/2023 | Zhu et al. | |
| 2024/0077582 A1 | 3/2024 | Cerqueira Pinto et al. | |
| 2025/0028042 A1 | 1/2025 | Bui-Van et al. | |
| 2025/0035766 A1 | 1/2025 | Farhat | |
| 2025/0052881 A1 | 2/2025 | Bui-Van et al. | |

* cited by examiner

VEHICULAR RADAR SYSTEM WITH BLOCKAGE DETECTION

CROSS REFERENCE TO RELATED APPLICATION

The present application claims the filing benefits of U.S. provisional application Ser. No. 63/516,238, filed Jul. 28, 2023, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular radar sensing system includes a radar sensor disposed at a vehicle. The radar sensor transmits radio signals and receives radio signals. The radar sensor is operable to capture radar data based on the received radio signals. An electronic control unit (ECU) includes electronic circuitry and associated software. Radar data captured by the radar sensor is transferred to the ECU. The electronic circuitry of the ECU includes at least one data processor. The ECU is operable to process radar data captured by the radar sensor and transferred to the ECU. The vehicular radar sensing system, via processing at the ECU of radar data captured by the radar sensor, detects a plurality of objects present within a field of sensing of the radar sensor. The vehicular radar sensing system determines a plurality of phase delays in the radar data, and each phase delay of the plurality of phase delays represents a delay in receiving radio signals at the radar sensor. Phase delays of the plurality of phase delays are associated with respective received radio signals reflected off respective detected objects of the plurality of detected objects. The vehicular radar sensing system determines a common phase delay of the plurality of phase delays that is common among the received radio signals reflected off detected objects. The vehicular radar sensing system determines a common phase delay of the plurality of phase delays that is common among the received radio signals reflected off detected objects. The vehicular radar sensing system estimates an amount of performance degradation of the radar sensor based at least in part on the determined blockage. The vehicular radar sensing system, responsive to determining that the amount of performance degradation of the radar sensor is greater than a threshold amount, adjusts a driving assistance system of the vehicle.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
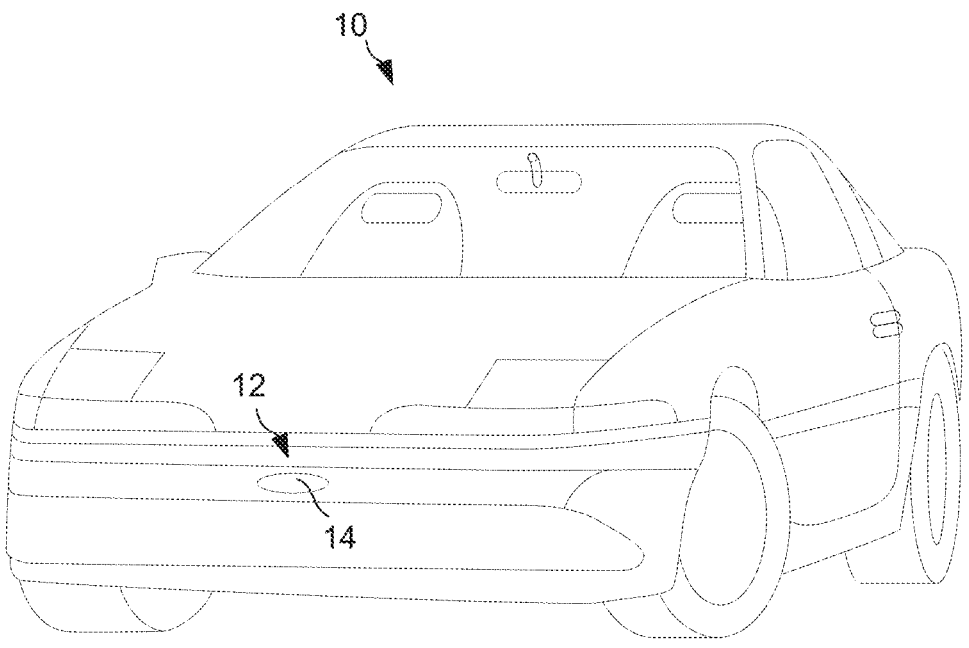
FIG. 1 is a perspective view of a vehicle with a sensing system that incorporates a radar sensor.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar sensors, or other sensors, such as a rearward facing sensor at the rear of the vehicle, and a sideward/rearward facing sensor at respective sides of the vehicle), which sense regions exterior of the vehicle. Optionally, the radar sensor may be disposed within an interior cabin of the vehicle and may sense within the interior cabin, such as for an occupant detection system or the like. The sensing system 12 includes a control or electronic control unit (ECU) that includes a data processor that is operable to process data captured by the radar sensor(s). The sensing system may also include a radar sensor that includes a plurality of transmitters that transmit radio signals via a plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controlling at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Implementations herein include a vehicular sensing system or vehicular radar system that detects a radar sensor blockage state and determines or estimates an amount of performance degradation in terms of range detection loss. As discussed in more detail below, to detect the radar sensor blockage state, the system analyzes phase progression linearity across all virtual receivers of a multiple-input multiple-output (MIMO) antenna array using signals received from several objects or targets in the equipped vehicle's surroundings. The system determines the amount of performance degradation relative to a state without blockage. More specifically, the system determines a power confidence and a history of signals received from the environment accumulated across several scans when no blockage is present. After a blockage event (e.g., when dirt or snow or debris or other obstruction or occlusion is present at the vehicle in the field of sensing of the radar sensor), the system estimates a power drop for the radar sensor, which is directly related to the estimation of loss in range detection capabilities.

Generally, at a front cover of a radar sensor, a radome (i.e., a bumper) blockage source can be seen as a case of a stratified layer through which the electromagnetic (EM) waves transmitted by the radar sensor must propagate. The radome layer is assumed to have a constant geometrical (e.g., thickness, curvature, etc.) and physical (e.g., permittivity) characteristics. In contrast, the blockage layer (e.g., dirt, snow, ice, etc.) is assumed to have, in general, a random thickness distribution and a slight difference in permittivity along the aperture. When the emitted EM waves propagate through the blockage layer, extra phase delay and attenuation occur. Because the blockage layer is assumed to be non-homogenous, the expectation is that both phenomena will vary along the virtual array based on a function of the considered virtual array antennas. Accordingly, the ideal linearity of the amplitude and phase aperture progression is affected, which is necessary for correct beamforming. Based on this, the system may derive a blockage detection indication based on evaluation of the phase progression linearity.

Figure 2:
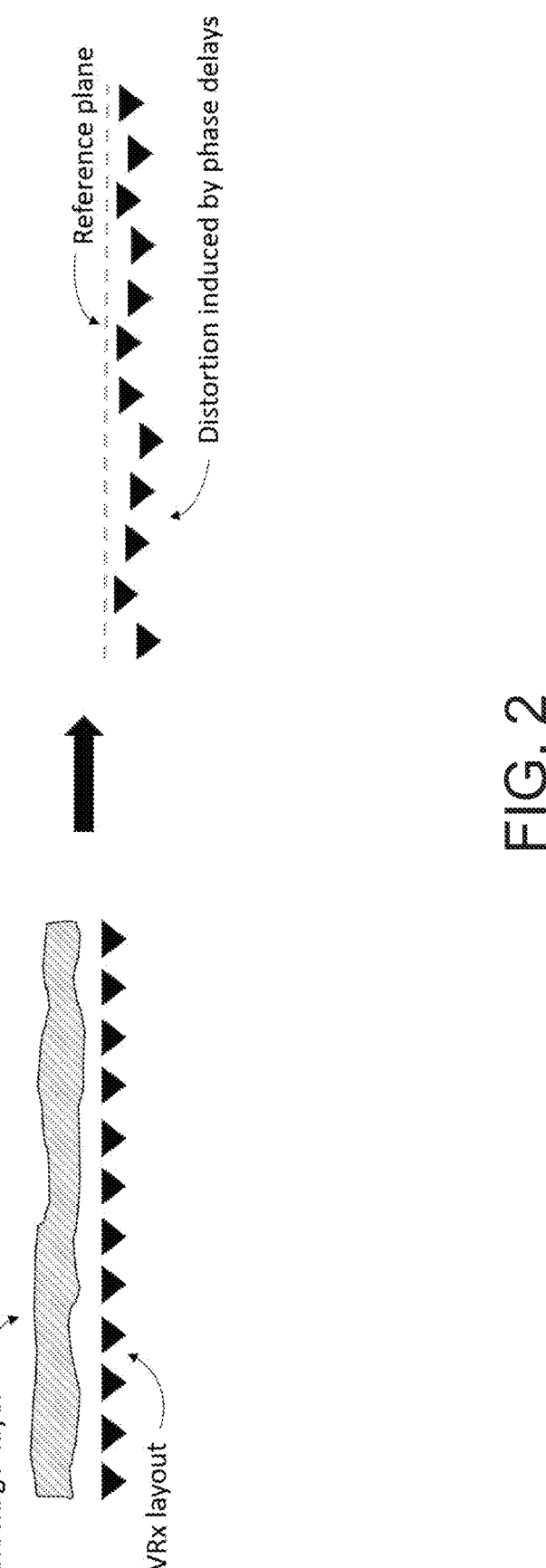
FIG. 2 is a schematic view of a blockage layer causing an unwanted phase delay of signals received by a radar sensor.

Focusing techniques may be used in synthetic aperture radar (SAR) imaging to compensate for non-linear sensor trajectory deviations. Synthetic aperture radar refers to capturing a sequence of acquisitions using shorter antennas and combining the acquisitions to simulate a radar with a much larger antenna (and subsequently a greater spatial resolution). Such deviations may provoke signal phase delays in ways comparable to the blockage layer of the radar sensor (FIG. 2). As shown in FIG. 2, a blockage layer (e.g., at a front cover of the sensor) causes an unwanted phase delay of signals received by the MIMO antenna array. This extra delay can be seen as equivalent to the phase error caused by trajectory non-linearities in SAR.

Thus, the system may employ similar techniques for virtual antenna arrays affected by blockage. Phase delays/terms due to blockage disturb the total received signal phase and are common for all the targets sensed during data capture or acquisitions or scans. Thus, because the common phase delay or term is present in the captured radar data for multiple targets and/or scans, the common term represents the phase delay resulting from blockage at the sensor. The remaining signal phase components may be assumed to have random distributions and therefore the common phase term (i.e., distortion due to blockage) may be estimated by means of, for example, a weighted least squares (WLS) procedure or technique. Since an unknown phase offset, due to the distance between sensor and targets, is present in the received signals, the aperture phase gradient may be used during the WLS procedure. That is, the aperture phase gradient may be used to account for the unknown phase delay incurred due to the distance between the radar sensor and the object reflecting the radar signals.

To estimate the amount of degradation caused by a blockage event, the system may perform road signature analysis by collecting the power received by the static environment at close ranges to the vehicle or radar sensor. However, the intensity of the road backscattered power will depend on the road characteristics. For example, the same type of surface in a wet condition presents a much weaker return relative to a dry condition. The system may determine an average over several cycles or scans (with memory strategies) in order to improve the road backscattering level estimation. In particular, the average procedure may limit the influence of static objects, such as cars or fixed reflective structures, which will rapidly move away in successive scans, enhancing, instead, the road signal, which will remain relatively constant within a short period of time.

Once a blockage event is detected (as discussed above), the amount of averaging may be tailored based on a time series of road backscattering values (i.e., historical data values) kept in memory (e.g., volatile or non-volatile memory disposed at the vehicle), in order to estimate the backscattering level before and after the blockage event. The difference between these values may be used for the degradation estimation and corresponding maximum detection range reduction quantification. For example, the system may determine a reduction in the maximum detection range of the radar sensor as a result of the blockage (FIG. 3).

Figure 3:
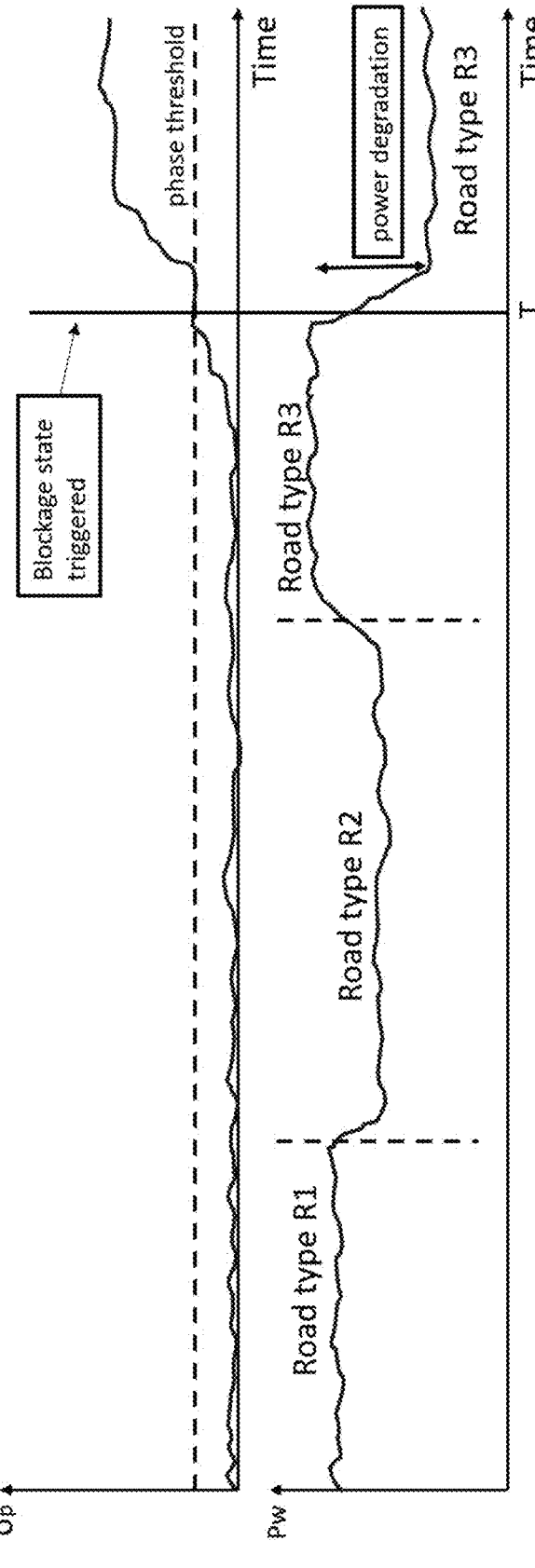
FIG. 3 is a plot of phase standard deviation and a plot of road backscattered power level.

As shown in FIG. 3, the upper plot shows the array phase standard deviation ($\sigma_p$) or a phase linearity measure that is estimated with respect to time. This may be measured from ignition (i.e., when the vehicle begins traveling) and compared against a phase threshold value. The lower plot shows the road backscattered power level ($P_w$) with respect to time. Different road types (e.g., dirt, gravel, asphalt, concrete, etc.) correspond to different power levels. These changes in power levels due to different road types are not considered a performance degradation by the system when the phase linearity does not exceed the phase threshold value. In the example of FIG. 3, the vehicle travels along three different road types (road type R1, road type R2, and road type R3). The lower plot shows the differences in the road backscattered power levels for each road type. However, in the transition from road R1 to road type R2 (and similarly in the transition from road type R2 to road type R3), the phase standard deviation stays below the phase threshold value, and thus no performance degradation is assigned to a blockage. However, at time T, the phase standard deviation exceeds the phase threshold level. At this point, the corresponding power level variation is used to estimate/determine the performance or power degradation of the radar system. The system may use historical road backscattered power levels to determine the degradation. In the example of FIG. 3, the data immediately before the blocked state may be used. In other examples, historical data (stored at the vehicle or at a remote server in wireless communication with the vehicle) from even earlier in the trip or during a previous trip may be used. For example, when the vehicle travels on a first asphalt road, then travels on a dirt road, and then begins traveling on a second asphalt road as a blockage is detected, the system may use the historical data from the first asphalt road to determine/estimate the degradation.

Figure 4:
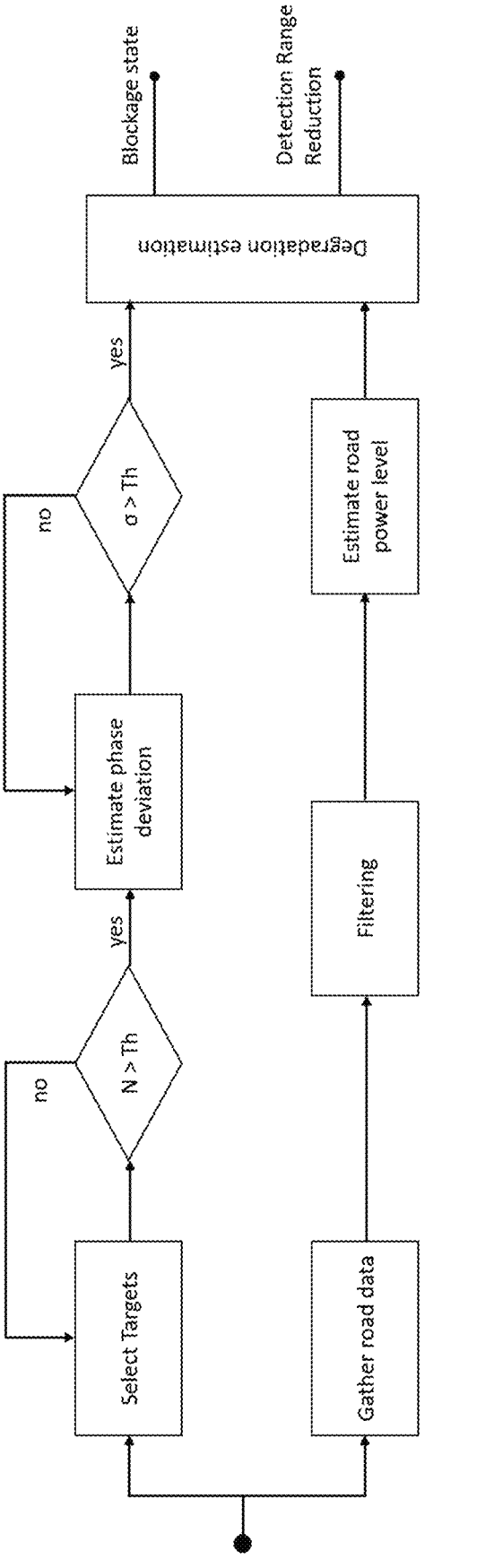
FIG. 4 is a flowchart for the sensing system of FIG. 1.

FIG. 4 includes an exemplary flow chart for the system. The flow chart includes a first path or pipeline where the system selects targets and when the number of targets exceeds a target threshold (i.e., the system detects at least a threshold number of objects), the system estimates phase deviation. When the phase deviation exceeds a threshold, the system estimates the performance degradation. In the lower path/pipeline, the system gathers road data (e.g., based on map data and GPS data and/or image data captured by a camera in addition to the radar data), filters the road data, and estimates/determines the road backscattered power. The system then estimates the performance degradation (e.g., the detection range degradation) using the estimated road backscattered power.

Optionally, the system, when estimating/determining the performance degradation (such as the degradation in range) meets or exceeds a threshold amount, may adjust a driving assistance system of the vehicle. For example, the system may reduce or limit speed/acceleration of the vehicle. In other examples, the system may disable one or more features, such as disabling an automatic lane change feature. Optionally, the system generates a warning or notification for an occupant of the vehicle when the degradation is greater than a threshold amount. The notification may describe any adjustments to the driving assistance systems that occur due to the degradation.

The system utilizes sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

The radar sensor or sensors may be disposed at the vehicle so as to sense exterior of the vehicle. For example, the radar sensor may comprise a front sensing radar sensor mounted at a grille or front bumper of the vehicle, such as for use with an automatic emergency braking system of the vehicle, an adaptive cruise control system of the vehicle, a collision avoidance system of the vehicle, etc., or the radar sensor may be comprise a corner radar sensor disposed at a front corner or rear corner of the vehicle, such as for use with a surround vision system of the vehicle or parking assist system of the vehicle, or the radar sensor may comprise a blind spot monitoring radars disposed at a rear fender of the vehicle for monitoring sideward/rearward of the vehicle for a blind spot monitoring and alert system of the vehicle. Optionally, the radar sensor or sensors may be disposed within the vehicle so as to sense interior of the vehicle, such as for use with a cabin monitoring system of the vehicle or a driver monitoring system of the vehicle or an occupant detection or monitoring system of the vehicle. The radar sensing system may comprise multiple input multiple output (MIMO) radar sensors having multiple transmitting antennas and multiple receiving antennas.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
    a radar sensor disposed at a vehicle;
    wherein the radar sensor transmits radio signals and receives radio signals;
    wherein the radar sensor is operable to capture radar data based on the received radio signals;
    an electronic control unit (ECU) comprising electronic circuitry and associated software;
    wherein radar data captured by the radar sensor is transferred to the ECU;
    wherein the electronic circuitry of the ECU comprises at least one data processor;
    wherein the ECU is operable to process radar data captured by the radar sensor and transferred to the ECU;
    wherein the vehicular radar sensing system, via processing at the ECU of radar data captured by the radar sensor, detects a plurality of objects present within a field of sensing of the radar sensor;
    wherein the vehicular radar sensing system determines a plurality of phase delays in the radar data, and wherein each phase delay of the plurality of phase delays represents a delay in receiving radio signals at the radar sensor;
    wherein phase delays of the plurality of phase delays are associated with respective received radio signals reflected off respective detected objects of the plurality of detected objects;
    wherein the vehicular radar sensing system determines a common phase delay of the plurality of phase delays that is common among the received radio signals reflected off detected objects;
    wherein the vehicular radar sensing system, responsive to determining the common phase delay, determines blockage of the radar sensor;
    wherein the vehicular radar sensing system estimates an amount of performance degradation of the radar sensor based at least in part on the determined blockage; and
    wherein the vehicular radar sensing system, responsive to determining that the amount of performance degradation of the radar sensor is greater than a threshold amount, adjusts a driving assistance system of the vehicle.

2. The vehicular radar sensing system of claim 1, wherein the vehicular radar sensing system determines the common phase delay of the plurality of phase delays using a weighted least squares technique.

3. The vehicular radar sensing system of claim 2, wherein the vehicular radar sensing system uses the weighted least squares technique with an aperture phase gradient of the radar sensor.

4. The vehicular radar sensing system of claim 1, wherein the radar sensor comprises a multiple-input multiple output (MIMO) radar sensor.

5. The vehicular radar sensing system of claim 1, wherein the vehicular radar sensing system, via processing at the ECU of radar data captured by the radar sensor, determines an amount of power of the received radio signals, and wherein the vehicular radar sensing system, responsive to determining the amount of power of the received radio signals, estimates the amount of performance degradation of the radar sensor.

6. The vehicular radar sensing system of claim 5, wherein the amount of performance degradation of the radar sensor represents a reduction of the maximum detection range of the radar sensor.

7. The vehicular radar sensing system of claim 5, wherein the vehicular radar sensing system determines the common phase delay across multiple scans of a plurality of scans of the radar sensor.

8. The vehicular radar sensing system of claim 7, wherein the vehicular radar sensing system determines an average amount of power of the received radio signals over the plurality of scans.

9. The vehicular radar sensing system of claim 8, wherein the vehicular radar sensing system compares the average amount of power to a historical average amount of power of the received radio signals, and wherein the historical average amount of power of the received radio signals is based on radar data captured by the radar sensor prior to blockage of the radar sensor.

10. The vehicular radar sensing system of claim 1, wherein the vehicular radar sensing system estimates the amount of performance degradation of the radar sensor based on historical road backscattered power level values.

11. The vehicular radar sensing system of claim 1, wherein the plurality of phase delays of the radar data comprises an array phase standard deviation.

12. The vehicular radar sensing system of claim 1, wherein the vehicular radar sensing system, responsive to determining that the amount of performance degradation of the radar sensor is greater than the threshold amount, generates a notification for an occupant of the vehicle.

13. The vehicular radar sensing system of claim 1, wherein the vehicular radar sensing system determines the plurality of phase delays of the radar data responsive to detecting, via processing at the ECU of radar data captured by the radar sensor, greater than a threshold number of objects.

14. The vehicular radar sensing system of claim 1, wherein the vehicular radar sensing system adjusts the driving assistance system of the vehicle by limiting a speed of the vehicle.

15. The vehicular radar sensing system of claim 1, wherein the vehicular radar sensing system adjusts the driving assistance system of the vehicle by disabling a feature of the driving assistance system.

16. The vehicular radar sensing system of claim 1, wherein the vehicular radar sensing system estimates the amount of performance degradation of the radar sensor based at least in part on a time series analysis of road signatures of roads the vehicle has traveled along.

17. The vehicular radar sensing system of claim 1, wherein the radar sensor senses exterior of the vehicle.

18. The vehicular radar sensing system of claim 1, wherein the radar sensor senses within an interior cabin of the vehicle.

19. A vehicular radar sensing system, the vehicular radar sensing system comprising:

a radar sensor disposed at a vehicle wherein the radar sensor senses exterior of the vehicle;

wherein the radar sensor transmits radio signals and receives radio signals;

wherein the radar sensor is operable to capture radar data based on the received radio signals;

an electronic control unit (ECU) comprising electronic circuitry and associated software;

wherein radar data captured by the radar sensor is transferred to the ECU;

wherein the electronic circuitry of the ECU comprises at least one data processor;

wherein the ECU is operable to process radar data captured by the radar sensor and transferred to the ECU;

wherein the vehicular radar sensing system, via processing at the ECU of radar data captured by the radar sensor, detects a plurality of objects present within a field of sensing of the radar sensor;

wherein the vehicular radar sensing system determines a plurality of phase delays in the radar data, and wherein each phase delay of the plurality of phase delays represents a delay in receiving radio signals at the radar sensor;

wherein phase delays of the plurality of phase delays are associated with respective received radio signals reflected off respective detected objects of the plurality of detected objects;

wherein the vehicular radar sensing system determines a common phase delay of the plurality of phase delays that is common among the received radio signals reflected off detected objects, wherein the vehicular radar sensing system determines the common phase delay of the plurality of phase delays using a weighted least squares technique;

wherein the vehicular radar sensing system, responsive to determining the common phase delay, determines blockage of the radar sensor;

wherein the vehicular radar sensing system estimates an amount of performance degradation of the radar sensor based at least in part on the determined blockage; and wherein the vehicular radar sensing system, responsive to determining that the amount of performance degradation of the radar sensor is greater than a threshold amount, adjusts a driving assistance system of the vehicle.

20. The vehicular radar sensing system of claim 19, wherein the vehicular radar sensing system uses the weighted least squares technique with an aperture phase gradient of the radar sensor.

21. The vehicular radar sensing system of claim 19, wherein the radar sensor comprises a multiple-input multiple output (MIMO) radar sensor.

22. The vehicular radar sensing system of claim 19, wherein the vehicular radar sensing system, via processing at the ECU of radar data captured by the radar sensor, determines an amount of power of the received radio signals, and wherein the vehicular radar sensing system, responsive to determining the amount of power of the received radio signals, estimates the amount of performance degradation of the radar sensor.

23. The vehicular radar sensing system of claim 22, wherein the amount of performance degradation of the radar sensor represents a reduction of the maximum detection range of the radar sensor.

24. A vehicular radar sensing system, the vehicular radar sensing system comprising:

a radar sensor disposed at a vehicle;

wherein the radar sensor transmits radio signals and receives radio signals;

wherein the radar sensor is operable to capture radar data based on the received radio signals;

an electronic control unit (ECU) comprising electronic circuitry and associated software;

wherein radar data captured by the radar sensor is transferred to the ECU;

wherein the electronic circuitry of the ECU comprises at least one data processor;

wherein the ECU is operable to process radar data captured by the radar sensor and transferred to the ECU;

wherein the vehicular radar sensing system, via processing at the ECU of radar data captured by the radar sensor, detects a plurality of objects present within a field of sensing of the radar sensor;

wherein the vehicular radar sensing system determines a plurality of phase delays in the radar data, and wherein each phase delay of the plurality of phase delays represents a delay in receiving radio signals at the radar sensor;

wherein phase delays of the plurality of phase delays are associated with respective received radio signals reflected off respective detected objects of the plurality of detected objects;

wherein the vehicular radar sensing system determines, across multiple scans of a plurality of scans of the radar sensor, a common phase delay of the plurality of phase delays that is common among the received radio signals reflected off detected objects;

wherein the vehicular radar sensing system, responsive to determining the common phase delay, determines blockage of the radar sensor;

wherein the vehicular radar sensing system, via processing at the ECU of radar data captured by the radar sensor, determines an amount of power of the received radio signals, and wherein the vehicular radar sensing system, responsive to determining the amount of power of the received radio signals, estimates an amount of performance degradation of the radar sensor from the determined blockage, and wherein the amount of performance degradation of the radar sensor represents a reduction of the maximum detection range of the radar sensor; and wherein the vehicular radar sensing system, responsive to determining that the amount of performance degradation of the radar sensor is greater than a threshold amount, adjusts a driving assistance system of the vehicle.

25. The vehicular radar sensing system of claim 24, wherein the vehicular radar sensing system determines an average amount of power of the received radio signals over the plurality of scans.

26. The vehicular radar sensing system of claim 25, wherein the vehicular radar sensing system compares the average amount of power to a historical average amount of power of the received radio signals, and wherein the historical average amount of power of the received radio signals is based on radar data captured by the radar sensor prior to blockage of the radar sensor.

27. The vehicular radar sensing system of claim 24, wherein the vehicular radar sensing system determines the plurality of phase delays of the radar data responsive to detecting, via processing at the ECU of radar data captured by the radar sensor, greater than a threshold number of objects.

28. The vehicular radar sensing system of claim 24, wherein the vehicular radar sensing system adjusts the driving assistance system of the vehicle by limiting a speed of the vehicle.

* * * * *